(12) United States Patent
Dreiling et al.

(10) Patent No.: US 11,064,347 B1
(45) Date of Patent: *Jul. 13, 2021

(54) ELECTRONIC SUBSCRIBER IDENTITY MODULE (ESIM) TRANSFER FROM INACTIVE DEVICE

(71) Applicant: T-MOBILE INNOVATIONS LLC, Overland Park, KS (US)

(72) Inventors: Ryan P. Dreiling, Shawnee, KS (US); Balasubramaniam Guru, Overland Park, KS (US); Philip W. Uehling, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,989

(22) Filed: Jul. 20, 2020

Related U.S. Application Data

(63) Continuation of application No. 16/665,941, filed on Oct. 28, 2019, now Pat. No. 10,764,746.

(51) Int. Cl.
| | |
|---|---|
| *H04W 8/18* | (2009.01) |
| *H04W 4/50* | (2018.01) |
| *H04L 9/32* | (2006.01) |
| *H04W 8/20* | (2009.01) |
| *H04W 8/26* | (2009.01) |
| *H04W 4/60* | (2018.01) |
| *H04W 60/04* | (2009.01) |
| *H04W 4/80* | (2018.01) |
| *H04W 12/40* | (2021.01) |

(52) U.S. Cl.
CPC ............ *H04W 8/205* (2013.01); *H04W 4/60* (2018.02); *H04W 4/80* (2018.02); *H04W 8/26* (2013.01); *H04W 12/40* (2021.01); *H04W 60/04* (2013.01)

(58) Field of Classification Search
None
See application file for complete search history.

(56) References Cited

U.S. PATENT DOCUMENTS

| | | | | |
|---|---|---|---|---|
| 9,184,801 | B2 * | 11/2015 | Li | H04B 5/0056 |
| 9,198,024 | B1 * | 11/2015 | Khalid | H04W 4/80 |
| 9,560,693 | B2 * | 1/2017 | Schell | H04L 63/0853 |
| 9,831,903 | B1 * | 11/2017 | Narasimhan | H04W 4/24 |
| 9,949,113 | B1 * | 4/2018 | Vasudevan | H04W 8/18 |
| 10,057,760 | B2 * | 8/2018 | Yang | H04W 8/183 |
| 10,061,942 | B2 * | 8/2018 | Yang | G06F 21/78 |
| 10,141,966 | B2 * | 11/2018 | Narasimhan | H04W 4/24 |
| 10,142,917 | B2 * | 11/2018 | Narasimhan | H04W 8/02 |
| 10,149,145 | B2 * | 12/2018 | Li | H04W 4/50 |

(Continued)

*Primary Examiner* — Tuan A Tran

(57) ABSTRACT

A mechanism of obtaining electronic subscriber identity module (eSIM) credentials from an inactive mobile communication device is described. This includes communicating, by an active mobile communication device, with an inactive mobile communication device via a peer-to-peer wireless interface. The active mobile communication device receives identification data for the eSIM credentials as stored in the inactive mobile communication device. The active mobile communication device transmits the identification data for the eSIM credentials to a subscription manager data preparation (SMDP+) server. The active mobile communication device also receives the eSIM credentials from the SMDP+ server.

20 Claims, 9 Drawing Sheets

(56) References Cited

U.S. PATENT DOCUMENTS

| | | | | |
|---|---|---|---|---|
| 10,149,150 | B1* | 12/2018 | Vasudevan | H04W 8/24 |
| 10,244,501 | B2* | 3/2019 | Miao | H04W 60/005 |
| 10,277,734 | B2* | 4/2019 | Hentschel | H04W 4/60 |
| 10,334,427 | B2* | 6/2019 | Yang | H04W 8/183 |
| 10,356,614 | B2* | 7/2019 | Li | H04W 12/0609 |
| 10,368,235 | B1* | 7/2019 | Balasubramanian | H04W 8/183 |
| 10,382,919 | B2* | 8/2019 | Karimli | H04W 4/70 |
| 10,405,181 | B2* | 9/2019 | Li | H04L 63/083 |
| 10,425,118 | B2* | 9/2019 | Yang | H04L 41/0806 |
| 10,652,728 | B1* | 5/2020 | Guday | H04W 8/183 |
| 10,681,665 | B2* | 6/2020 | Singh | H04W 76/10 |
| 10,687,298 | B2* | 6/2020 | Miao | H04W 60/00 |
| 10,708,766 | B1* | 7/2020 | Umamaheswaran | H04W 8/245 |
| 2015/0350876 | A1* | 12/2015 | Khalid | H04W 4/80 455/419 |
| 2018/0352425 | A1* | 12/2018 | Vasudevan | H04W 8/18 |
| 2018/0352530 | A1* | 12/2018 | Singh | H04W 76/23 |
| 2019/0037401 | A1* | 1/2019 | Egner | H04W 12/00502 |
| 2019/0174299 | A1* | 6/2019 | Ullah | H04L 63/0876 |
| 2019/0208417 | A1* | 7/2019 | Kang | H04L 29/06 |
| 2019/0289455 | A1* | 9/2019 | Namiranian | H04W 4/50 |
| 2019/0327591 | A1* | 10/2019 | Karimli | H04L 9/3213 |
| 2019/0349743 | A1* | 11/2019 | Hamblet | H04M 15/64 |
| 2019/0387396 | A1* | 12/2019 | Gui | H04W 8/265 |
| 2020/0059778 | A1* | 2/2020 | Li | H04W 8/205 |
| 2020/0137557 | A1* | 4/2020 | Touati | H04W 8/205 |
| 2020/0260241 | A1* | 8/2020 | Sicard | H04W 12/004 |

* cited by examiner

ELECTRONIC SUBSCRIBER IDENTITY
MODULE (ESIM) TRANSFER FROM
INACTIVE DEVICE

CROSS-REFERENCE TO RELATED
APPLICATIONS

This application is a continuation of and claims priority under 35 U.S.C. § 120 to U.S. patent application Ser. No. 16/665,941 filed on Oct. 28, 2019, entitled "Electronic Subscriber Identity Module (eSIM) Transfer From Inactive Device," by Ryan P. Dreiling, et al., which is incorporated herein by reference in its entirety for all purposes.

STATEMENT REGARDING FEDERALLY
SPONSORED RESEARCH OR DEVELOPMENT

Not applicable.

REFERENCE TO A MICROFICHE APPENDIX

Not applicable.

BACKGROUND

Mobile communication devices provide authentication information to cell sites when they attach to the radio access network to receive wireless communication services. This authentication information allows the wireless service provider to identify the mobile communication device and determine if the device has privileges for accessing its network. Sometimes this authentication information is stored on a subscriber identity module (SIM) that is installed into the mobile communication device. This may be referred to as a traditional SIM in some contexts. A traditional SIM is a smart card that can be installed into a first mobile communication device to provide the first device access to a radio access network. The traditional SIM can be removed from the first mobile communication device and installed into a second mobile communication device to provide the second device access to the radio access network. This may be referred to as "pop-and-swap" in some contexts.

SUMMARY

In an embodiment, a method of obtaining electronic subscriber identity module (eSIM) credentials from an inactive mobile communication device is disclosed. The method comprises communicating, by an active mobile communication device, with an inactive mobile communication device via a peer-to-peer wireless interface. The method further comprises receiving, by the active mobile communication device, identification data for the eSIM credentials as stored in the inactive mobile communication device. The method further comprises transmitting, by the active mobile communication device, the identification data for the eSIM credentials toward a subscription manager data preparation (SMDP+) server. The method further comprises receiving, by the active mobile communication device, the eSIM credentials from the SMDP+ server.

In another embodiment, a method of updating eSIM credentials from an inactive mobile communication device to an active mobile communication device at a SMDP+ server is disclosed. The method comprises receiving, at the SMDP+ server, identification data for eSIM credentials associated with the inactive mobile communication device, the identification data for eSIM credentials received from the active mobile communication device. The method further comprises validating, by the SMDP+ server, an integrated circuit card identifier (ICCID) of the inactive mobile communication device, an embedded universal integrated circuit card identifier (EID) of the inactive mobile communication device, a matching identifier (ID) associated with the eSIM credentials, and a confirmation code associated with a user. The method further comprises assigning the eSIM credentials to an EID of the active mobile communication device. The method further comprises initiating, by the SMDP+ server, a package download to transfer the eSIM credentials to the active mobile communication device.

In yet another embodiment, a first mobile communication device (e.g., an active mobile communication device) is configured to obtain eSIM credentials from an inactive mobile communication device. The first mobile communication device comprises a peer-to-peer wireless interface. The first mobile communication device is further configured to communicate with an inactive mobile communication device via the peer-to-peer wireless interface. The peer-to-peer wireless interface is also configured to receive identification data for the eSIM credentials as stored in the inactive mobile communication device. The first mobile communication device also comprises a wireless transmitter configured to transmit the identification data for the eSIM credentials toward a SMDP+ server. The first mobile communication device also comprises a wireless receiver configured to receive the eSIM credentials from the SMDP+ server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
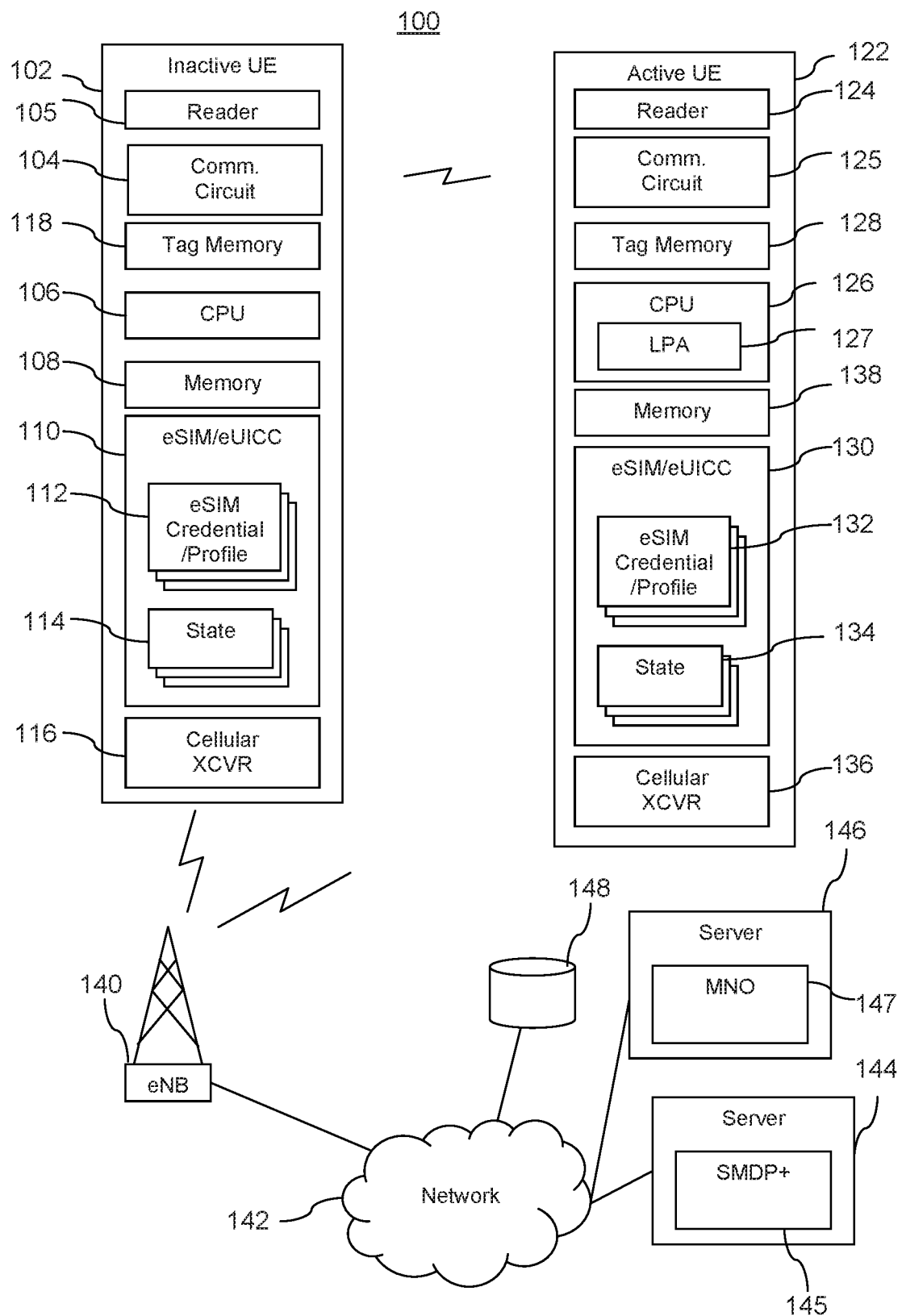
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A user may wish to shift his or her wireless communication service from a first mobile communication device to a second mobile communication device. For example, a user may wish to shift wireless service upon upgrading from a first mobile phone to a second mobile phone. One mechanism for performing such a swap is a subscriber identity module (SIM) card. The SIM can be easily removed from one mobile communication device and inserted into another using a so called pop-and-swap technique. However, some mobile communication devices are now omitting the removable SIM and replacing it with an embedded SIM (eSIM). The eSIM provides confidential information for authenticating into a radio access network (RAN) but is not removable by the user. eSIMs can be condensed to be smaller than SIMs, and hence provide certain technological benefits when designing a mobile communication device.

However, the inclusion of this technological solution leads to certain technological problems. Specifically, users are known to damage mobile communication devices. For example, such devices can be dropped, washed, or otherwise broken. With SIM technology, service can be moved from a broken mobile communication device by simply removing the SIM chip. However, eSIMs cannot be removed. Hence, swapping eSIM credentials from a broken mobile communication device is quite difficult.

The present disclosure teaches a system and method that provides a technical solution for the technical problem of transferring eSIM credentials from an inactive mobile communication device to an active mobile communication device. As used herein, an inactive mobile communication device is a device that has been broken or otherwise incapacitated, for example to the point that the inactive mobile communication device is no longer capable of providing main power to a user interface and/or wireless communications components. To overcome this problem, the present disclosure employs an unpowered communication circuit at the inactive mobile communication device that can be read and/or altered by a reader at an active mobile communication device. For example, a radio frequency identify (RFID) circuit and/or a near field communication (NFC) circuit can be positioned in the inactive mobile communication device and can be activated by a remote reader without main internal power. The communication circuit can have access to rewritable memory that contains identification data for the eSIM credentials that access the RAN. A corresponding RFID and/or NFC reader at the active mobile communication device can read and/or write to the memory at the inactive mobile communication device via the RFID/NFC circuit. This process can be used to obtain the relevant data to transfer the eSIM credentials from the inactive mobile communication device to the active mobile communication device.

For example, a user may employ a user interface (UI) to access a local profile assistant (LPA) at the active mobile communication device in order to initiate the RFID/NFC reader at the active mobile communication device. An RFID reader and/or an NFC reader may be referred to collectively herein as a peer-to-peer wireless interface. The active mobile communication device is then placed in close proximity to the inactive mobile communication device to allow a peer-to-peer wireless connection to be established between the devices. The peer-to-peer wireless interface allows the active mobile communication device to read the identification data for the eSIM credentials from the inactive mobile device. In some examples, the identification data can include a fully qualified domain name (FQDN) address of a subscription manager data preparation (SMDP+) server, an integrated circuit card identifier (ICCID) of the inactive mobile communication device, an embedded universal integrated circuit card identifier (EID) of the inactive mobile communication device, a matching identifier (ID) associated with the eSIM credentials, and a confirmation code associated with a user. In other examples, some or all of the preceding items can instead be stored in a lookup table in a network, and the identification data can be any identifier that uniquely identifies the inactive mobile communication device. In such a case, the identification data can act as a key to look up such items from the table.

Once the identification data has been obtained, the LPA can request a user enter a confirmation code. The LPA can then compare the confirmation code received from the user with the confirmation code received from the inactive mobile communication device to verify that the switch is user initiated. The active mobile communication device can then employ the peer-to-peer wireless interface to clear eSIM related data from the inactive mobile communication device to ensure the inactive mobile communication device is unable to use the eSIM credentials in the event of a repair. Clearing the eSIM related data may include clearing eSIM credentials from RFID chip tag memory at the inactive mobile device. When clearing the eSIM related data, the active mobile communication device may also employ functionality to verify that the cleared eSIM credential is also deleted and/or disabled locally on the eSIM and/or a corresponding embedded universal integrated circuit card (eUICC) of the inactive mobile communication device. This may ensure the inactive mobile communication device is unable to use the eSIM credentials in the event of a repair. The LPA at the active mobile communication device can also establish a connection with a SMDP+ server by using the SMDP+ address from the identification data for the eSIM credentials. The LPA can add the EID for the active mobile communication device to the identification data for the eSIM credentials and pass the identification data for the eSIM credentials to the SMDP+ server.

The SMDP+ server can optionally employ the identification data for the eSIM credentials to access a lookup table (e.g., if the identification data does not contain sufficient information for validation). Further, the SMDP+ server can validate the EID of the inactive mobile communication device, the ICCID, the matching ID, and the confirmation code to verify that the eSIM credentials are valid as to the inactive mobile communication device and associated user. The SMDP+ server may also perform a fraud check by forwarding the identification data for the eSIM credentials to a mobile network operator (MNO) server. The MNO server can then check such data for lost, stolen, or frequent transfer attempts characteristics. Once the fraud check is complete, the SMDP+ server can assign the eSIM credentials to the EID of the active mobile communication device and cause the LPA at the active mobile communication device to download a package containing the eSIM credentials. The active mobile communication device can then use the eSIM credentials to begin accessing the RAN.

The disclosed eSIM transfer system and method provides a beneficial mechanism for transferring eSIM credentials between devices when a source mobile communication device is inactive, inoperable, or otherwise damaged. This is because the eSIM transfer occurs via a peer-to-peer wireless interface that does not require main power at a source mobile communication device, and hence the eSIM transfer can be completed when the transmitter, processor, and/or user interface of the source mobile communication device is disabled. As such, the disclosed embodiments provide a mechanism for transferring eSIM credentials without seeking intervention from a network administrator for a damaged mobile communication device that is unable to access the RAN. Hence, the disclosed embodiments reduce the network resources and personnel resources that would otherwise be expended in manually reassigning eSIM credentials from the network side. Further, the disclosed embodiments provide additional functionality at both the inactive and active mobile communication devices by allowing an eSIM credential transfer that would otherwise not be possible due to the embedded nature of eSIMs.

In addition, the disclosed eSIM transfer system and method provides a benefit in that only one mobile communication device is enabled to use the single set of eSIM credentials at any one time. Specifically, by disabling the eSIM credentials of the inactive mobile communication device upon requesting that eSIM credentials be assigned to the active mobile communication device, the business rule of providing wireless communication service to a single set of eSIM credentials on a single mobile communication device is enforced. Also, the peer-to-peer wireless interface is relatively short range, and a confirmation code known only to the user may be required to initiate the transfer. Accordingly, the risk that an unauthorized device might hijack the eSIM credentials is reduced. In some examples the risk of malicious eSIM profile transfer (e.g., hijacking) may be further reduced by adding additional security checks. For example, a mechanism may be employed (e.g., by the SMDP+ server or the active mobile communication device) to determine if the source mobile communication device (e.g., the presumably inactive mobile communication device) is powered on. In that case, the mechanism may prompt the source mobile communication device to prompt the user to consent to access to the contents of the RFID chip. This may prevent the malicious destination device (e.g., the active mobile communication device) from reading the contents of the RFID chip. In some examples, a lock may also be applied to the RFID chip during a normal transceiver power down in order to prevent malicious reading of the contents of the RFID chip when the source mobile communications device is not damaged. In such a case, the lock may be removed as part of the power up cycle of the source mobile communications device to allow the disclosed mechanisms to occur in case of damage to the source mobile communications device during use. Therefore, the disclosed embodiments provide increased security, increased functionality, and reduced system resource usage while solving a technological problem specific to a network environment.

Turning now to FIG. 1, a communication system 100 is described. In an embodiment, the system 100 comprises an inactive mobile communication device 102 and an active mobile communication device 122. The inactive mobile communication device 102 may be a mobile phone, a smart phone, a personal digital assistant (PDA), a headset computer, a wearable computer, a laptop computer, a notebook computer, a tablet computer, or other device capable of connecting to a RAN. The active mobile communication device 122 may also be mobile phone, a smart phone, a personal digital assistant (PDA), a headset computer, a wearable computer, a laptop computer, a notebook computer, a tablet computer, or other device capable of connecting to a RAN. In an embodiment, the inactive mobile communication device 102 and the active mobile communication device 122 may be different types of devices. For example, in an embodiment, the inactive mobile communication device 102 may be a mobile phone and the active mobile communication device 122 may be a smart phone. For example, in an embodiment, the inactive mobile communication device 102 may be a mobile phone and the active mobile communication device 122 may be a laptop computer. It should be noted that, as used herein, an active mobile communication device 122 is a fully operational device, while an inactive mobile communication device 102 is not fully operational as discussed below. The terms active and inactive, as used herein, should not be construed to describe a current authentication status over a RAN.

The inactive mobile communication device 102 may also be referred to as a user equipment (UE) and may comprise a communications circuit 104, a processor 106, a memory 108, an electronic subscriber identity module (eSIM) 110 storing one or more sets of eSIM credentials 112 and storing one or more eSIM state registers 114, and a cellular radio transceiver 116. The eSIM 110 may be stored on a eUICC. Further, the eSIM credentials 112 may also be referred to as an eSIM profile. In an embodiment, the number of different sets of eSIM credentials 112 in the eSIM 110 is the same as the number of eSIM state registers 114. In an embodiment, the eSIM 110 is configured to store up to five different sets of eSIM credentials 112 and up to five different eSIM state registers 114. For purposes of the present disclosure, the inactive mobile communication device 102 is a mobile communication device that is inoperable, damaged, or otherwise incapacitated such that the mobile communication device is unable to communicate the eSIM credentials 112 via the cellular radio transceiver 116. Specifically, the present disclosure focuses on a mechanism to reassign the eSIM credentials 112 stored in the eSIM 110 to the active mobile communication device 122 when power is unavailable to some or all of the components of the inactive mobile communication device 102. For example, power may be unavailable to activate the eSIM 110, the processor 106, the cellular radio transceiver 116, the memory 108, and/or the communications circuit 104. In some examples, the inactive mobile communication device 102 may also comprise a reader 105, which may be substantially similar to a reader 124 as discussed in more detail below.

The communications circuit 104 can be any circuit capable of wireless peer-to-peer communication without having access to the main power source for the device (e.g., a main battery). For example, the communications circuit 104 may be implemented as an RFID circuit and/or an NFC circuit. The communications circuit 104 also contains and/or has access to a rewritable tag memory 118. The tag memory 118 stores small amounts of data, for example, on the order of tens or hundreds of bytes. The communications circuit 104 is configured to read and write data to the tag memory 118 in response to a signal from a reader 124 at the active mobile communication device 122. The tag memory 118 contains identification data for the eSIM credentials 112 as stored in the eSIM 110. In one embodiment, the communications circuit 104 stores a FQDN server address for a SMDP+ server 144, an ICCID associated with a user profile related to the inactive mobile communication device 102, an EID associated with the inactive mobile communication device 102, a matching ID associated with the eSIM credentials 112 (e.g., as originally used to download the eSIM credentials 112), and a confirmation code previously set by a user (e.g., a personal identification number (PIN), a password, etc.). In another embodiment, the communications circuit 104 stores data uniquely identifying the inactive mobile communication device 102 to support looking up some or all of the preceding list of data by components associated with a network 142.

The active mobile communication device 122 comprises a reader 124, a tag memory 128, a processor 126, a memory 138, an eSIM 130 capable of storing one or more sets of eSIM credentials 132 and storing an eSIM state register 134, and a cellular radio transceiver 136. The processor 126 is configured to execute an LPA 127. An LPA 127 is an application configured to communicate with an SMDP+ server 144 for the purposes of managing eSIM credentials 132. The active mobile communication device 122 is substantially similar to the inactive mobile communication device 102, except the active mobile communication device 122 can be assumed to be fully functional. For example, the active mobile communication device 122 can be a replacement for a broken inactive mobile communication device 102. In some examples, the active mobile communications device 122 may also comprise a communications circuit 125, which may be substantially similar to a communications circuit 104 as discussed above.

The LPA 127 is configured to control operations of the reader 124 based on user commands. The reader 124 is a device capable of establishing a peer-to-peer communication with the communications circuit 104 in the inactive mobile communication device 102 when the devices 102 and 122 are in close proximity (e.g., three feet or less). For example, the reader 124 may be an RFID reader and/or an NFC circuit. Specifically, the LPA 127 is configured to cause the reader 124 to read the identification data for the eSIM credentials 112 from the tag memory 118 via the communications circuit 104. The LPA 127 can then use the identification to data obtain corresponding eSIM credentials 132. The LPA 127 can also store further identification data in the tag memory 128 for use in the event that the active mobile communication device 122 is broken at a later point in time.

The system 100 further comprises a cell site 140, a network 142, a SMDP+ server 144 that executes an SMDP+ application 145, a computer system (e.g., a server) 146 that executes an MNO application 147, and a data store 148. The mobile communication devices 102, 122 are designed to communicate with the network 142 via the cell site 140 by using cellular radio transceivers 116 and 136. However, as noted above, the inactive mobile communication device 102 is disabled and may be unable to access the cellular radio transceiver 116, and hence may be unable to communicate with cell site 140.

The cell site 140 and at least a portion of the network 142 provides wireless communication service according to at least one of a fifth generation (5G) 3rd Generation Partnership Project (3GPP) network, a fourth generation (4G) 3GPP network, a long term evolution (LTE) network, a code division multiple access (CDMA) protocol, a global system for mobile communications (GSM) protocol, a worldwide interoperability for microwave access (WiMAX) telecommunication protocol, or other wireless cellular data communication based technologies. The network 142 comprises one or more public networks, one or more private networks, or a combination thereof. While a single cell site 140 is shown in FIG. 1, it is understood that the system 100 may comprise any number of cell sites 140. While two mobile communication devices 102, 122 are shown in FIG. 1, it is understood that the system 100 may comprise any number of mobile communication devices.

When operational, the mobile communication devices 102, 122 may exchange messages with the cell site 140 to authenticate into a radio access network (RAN) and to receive cellular wireless communication service from the cell site 140 and/or other cell sites. Part of the authentication processes comprises the mobile communication devices 102, 122 providing at least some of the eSIM credentials 112, 132 to the cell site 140. In an embodiment, a set of eSIM credentials 112, 132 comprises one or more of a universal integrated circuit card identity (ICCID), an international mobile subscriber identity (IMSI), mobile station integrated service digital network identity (MSISDN), and/or mobile dialing number (MDN). The eSIM credentials 112, 132 may comprise one or more network authentication values, credentials, and keys, for example a Ki value. As such, obtaining eSIM credentials 132 based on the identification data for eSIM credentials 112 allows the active mobile communication device 122 to access the RAN using a service subscription originally associated with the inactive mobile communication device 102.

In an embodiment, the eSIMs 110, 130 may further comprise applications for pairing, locking, provisioning, and other activities. The eSIMs 110, 130 may comprise a mobile username and a mobile Internet Protocol (IP) password. The eSIMs 110, 130 may comprise a domain name. In an embodiment, a set of eSIM credentials 112 may be about 100 kbytes in size to about 200 kbytes in size. In another embodiment, the eSIM credentials 112 may be about 75 kbytes in size to about 500 kbytes in size.

The SMDP+ application 145 is an application configured to create, generate, manage, and protect eSIMs 110 and 130. Specifically, the SMDP+ application 145 is responsible for managing the life cycle of the eSIMs 110 and 130. For example, the SMDP+ application 145 is configured to control downloads of bound profile packages containing eSIMs 110 and 130. Further, the SMDP+ application 145 is configured to validate identification data for eSIM credentials 112 and 132 in order to verify that a requesting device is authorized to receive an eSIM 110 and 130.

The MNO application 147 is configured to operate wireless traffic over the cell site 140 and the network 142. The MNO application 147 is configured to perform many tasks. For example, the MNO application 147 may be configured to manage and view data related to transfer attempts, phone thefts, lost phones, and other subscription changes. As such, the MNO application 147 can be configured to perform fraud checks during a request for a change in order to determine when a requested change is potentially unauthorized. Further, the SMDP+ application 145 may communicate with the MNO application 147 to initiate a fraud check upon transfer of an eSIM credential 112 from an inactive mobile communication device 102 to an eSIM credential 132 at an active mobile communication device 122. Such a fraud check can provide additional security to such transfer processes.

Figure 2:
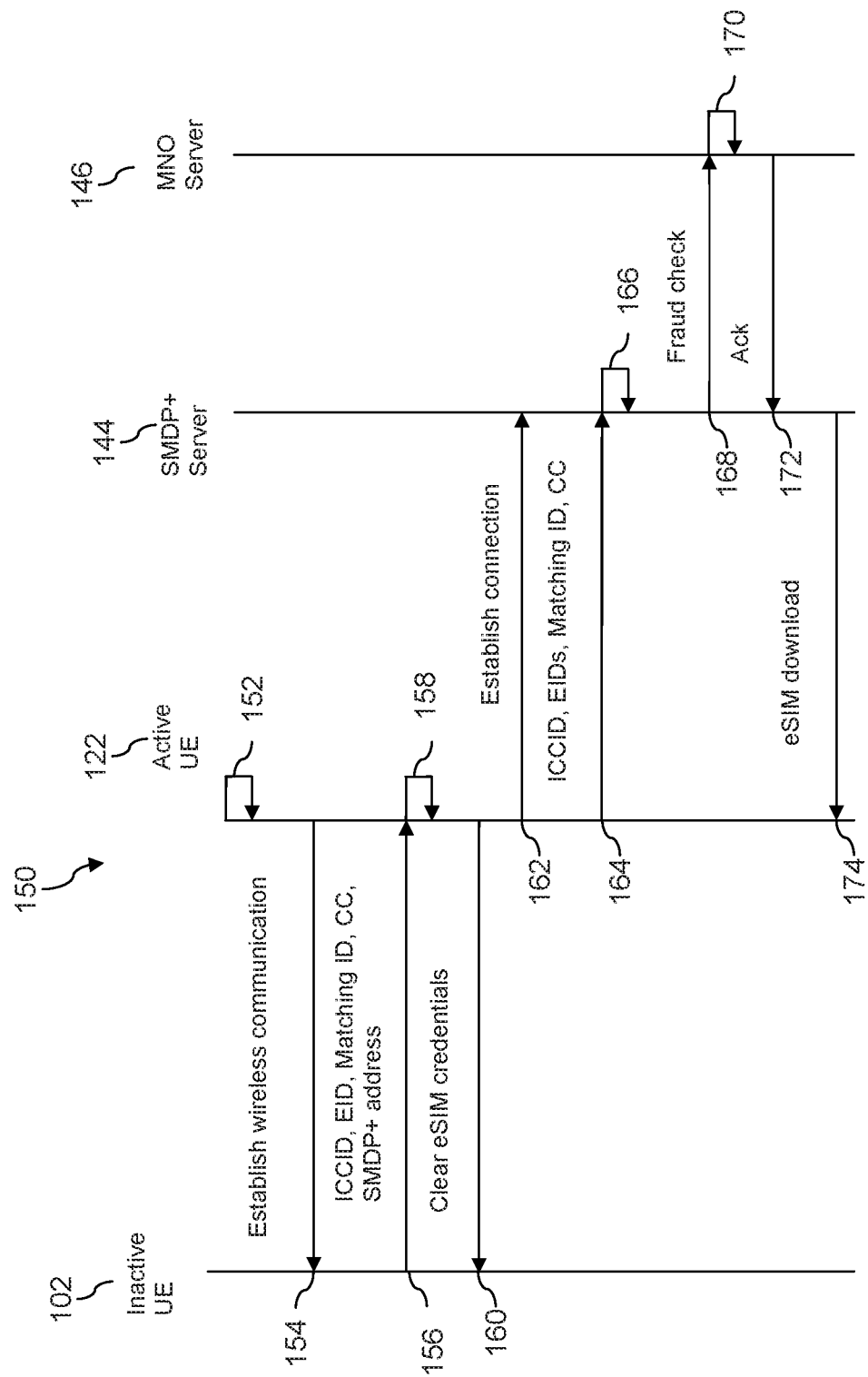
FIG. 2 is a message sequence diagram of an eSIM transfer between an inactive mobile communication device and an active mobile communication device according to an embodiment of the disclosure.

Turning now to FIG. 2, a message sequence 150 is described. In an embodiment, the message sequence 150 supports an eSIM transfer between an inactive mobile communication device 102 and an active mobile communication device 122. The message sequence 150 operates between an inactive mobile communication device 102, an active mobile communication device 122, a SMDP+ server 144, and an MNO server 146, for example via a network 142 as shown in FIG. 1.

Prior to becoming inactive, and hence prior to the initiation of message sequence 150, the inactive mobile communication device 102 stores identification data relating to eSIM credentials in a local tag memory 128. In the embodiment shown in FIG. 2, such data includes a FQDN address of the SMDP+ server 144, an ICCID of the inactive mobile communication device 102, an EID of the inactive mobile communication device 102, a matching ID associated with the eSIM credentials 112, and a confirmation code associated with a user. The inactive mobile communication device 102 then becomes inactive due to damage or other incapacity.

At label 152, a user opens a UI to access a LPA 127 at the active mobile communication device 122. The user can then select an option through the UI to invoke a peer-to-peer wireless interface at the active mobile communication device 122. The peer-to-peer wireless interface may include an RFID reader and/or an NFC reader, for example. The user further places the active mobile communication device 122 in close proximity to the inactive mobile communication device 102. This allows the peer-to-peer wireless interface to establish a wireless communication between the active mobile communication device 122 and the inactive mobile communication device 102 at label 154.

At label 156, the active mobile communication device 122 reads the identification data for the eSIM credentials 112 from the inactive mobile communication device 102 via the peer-to-peer wireless interface. Hence, the active mobile communication device 122 receives the FQDN address of the SMDP+ server 144, the ICCID, the EID of the inactive mobile communication device 102, the matching ID, and the confirmation code from the inactive mobile communication device 102.

Once the identification data has been obtained by the peer-to-peer wireless interface in the active mobile communication device 122, the LPA 127 on the active mobile communication device 122 can request the user enter a confirmation code at label 158. The confirmation code acts as a secure PIN code that corresponds specifically to the eSIM profile and is only known to the user/owner of the inactive mobile communication device 102. The LPA 127 can then compare the confirmation code received from the user with the confirmation code received from the inactive mobile communication device 102 at label 156 to verify that the switch is user initiated. This approach provides security as the confirmation code may be known by the user but may not be known to a malicious actor. As such, a malicious actor that stole the inactive mobile communication device 102 would be unable to proceed with an eSIM transfer. Hence, the present example provides greater security than a mobile device using a physical SIM as a malicious actor could move a physical SIM via the pop and swap method without such authorization.

If the confirmation code matches at label 158, the active mobile communication device 122 can then employ the peer-to-peer wireless interface at label 160 to clear eSIM related data from the memory tag at the inactive mobile communication device 102. This ensures that the inactive mobile communication device 102 is unable to use the eSIM credentials without additional intervention. This ensures that a malicious actor could not simply repair the inactive mobile communication device 102 to obtain access to the eSIM credentials.

At label 162, the LPA 127 at the active mobile communication device 122 can also establish a connection with the SMDP+ server 144 (e.g., over the RAN) by using the SMDP+ address from the identification data for the eSIM credentials as received via the peer-to-peer wireless interface. It should be noted that label 160 and label 162 can be performed in any order including concurrently. Once the connection is established, the LPA 127 can add the EID for the active mobile communication device 122 to the identification data for the eSIM credentials 132 and pass the identification data for the eSIM 132 credentials to the SMDP+ server 144. By sending the EIDs for both the active mobile communication device 122 and the inactive mobile communication device 102 as well as the ICCID, the matching ID, and the confirmation code at label 164, the SMDP+ server 144 receives sufficient information to determine whether an eSIM transfer is authorized.

At label 166, the SMDP+ server 144 receives and validates the EID of the inactive mobile communication device, the ICCID, the matching ID, and the confirmation code to verify that the eSIM credentials 112 are valid as to the inactive mobile communication device 102 and associated user. For example, the SMDP+ server 144 can employ an eSIM number nine (ES9)+ interface with the LPA 127 to receive such data and determine that all such data matches database records stored in the SMDP+ server 144.

At label 168, the SMDP+ server 144 may perform a fraud check by forwarding the identification data for the eSIM credentials 132 to the MNO server 146. For example, the identification data for the eSIM credentials 132 can be forwarded via an eSIM number two (ES2)+ interface between the SMDP+ server 144 and the MNO server 146. At label 170, the MNO server 146 can then automatically perform a check on the identification data for the eSIM credentials 132 against local files to check for lost, stolen, or frequent transfer characteristics. For example, the MNO server 146 can check the ICCID (which identifies the eSIM) and the EIDs for both the inactive mobile communication device 102 and the active mobile communication device 122 to determine if any of those items have been flagged as stolen or lost as well to determine if an unusual number of transfer attempts have already occurred. Upon determining that the request should be honored, the MNO server 146 can send an affirmation acknowledgement back to the SMDP+ server 144 at label 172. For example, the affirmation acknowledgement can be sent back via the ES2+ interface.

Once the fraud check is complete, the SMDP+ server 144 can assign the eSIM credentials 112 to the EID of the active mobile communication device 122. The SMDP+ server 144 can then initiate an eSIM profile package download to the LPA 127 at the active mobile communication device 122 at label 174, for example via an eSIM number nine (ES9)+ interface. This causes the LPA 127 at the active mobile communication device 122 to download and install the eSIM credentials 132. The active mobile communication device 122 can then use the eSIM credentials 132 to begin accessing the RAN. Further, the active mobile communication device 122 can store identification data for the eSIM credentials 132 in tag memory 128 for future use in the event the active mobile communication device 122 later becomes inoperable.

Figure 3:
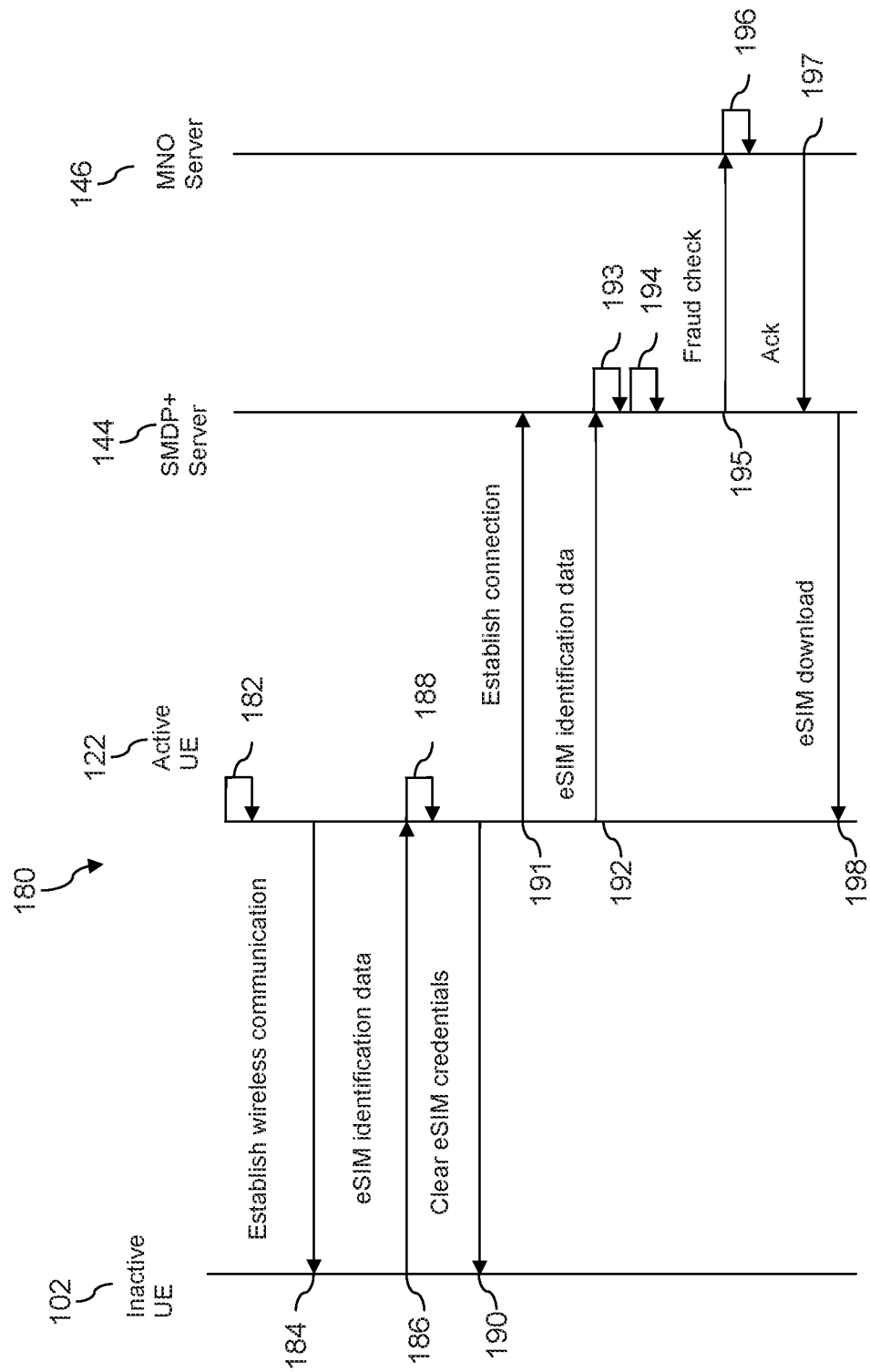
FIG. 3 is a message sequence diagram of another eSIM transfer between an inactive mobile communication device and an active mobile communication device according to an embodiment of the disclosure.

Turning now to FIG. 3, a message sequence 180 is described. In another embodiment, the message sequence 180 supports another eSIM transfer between an inactive mobile communication device 102 and an active mobile communication device 122. The message sequence 180 operates between an inactive mobile communication device 102, an active mobile communication device 122, a SMDP+ server 144, and an MNO server 146, for example via a network 142 as shown in FIG. 1. Message sequence 180 is substantially similar to message sequence 150. However, message sequence 180 contemplates that a complete set of identification data for an eSIM profile may not be stored in tag memory 118 at the inactive mobile communication device 102. For example, some combination of this data may instead be stored in a lookup table accessible by the SMDP+ server 144 to reduce the amount of data stored in the tag memory 128. This may be beneficial in some instances as space may be limited in the tag memory 128.

Actions performed at labels 182 and 184 are substantially similar to actions performed at labels 152 and 154, respectively. At label 186, the reader at the active mobile communication device 122 reads eSIM identification data from the inactive mobile communication device 102 in a manner similar to label 156. However, the eSIM identification data may instead contain data uniquely identifying the inactive mobile communication device 102, which can act as a lookup value. For example, the eSIM identification data can act as a key to look up a full set of eSIM identification data from a lookup table. The eSIM identification data may also contain a confirmation code and a FQDN address of the SMDP+ server 144 to support functionality at the active mobile communication device 122 prior to connecting to the SMDP+ server 144. For example, the LPA 127 at the active mobile communication device 122 may employ the confirmation code at label 188 in a manner similar to label 158.

Actions performed at label 190 are substantially similar to actions performed at label 160. At label 191, the LPA 127 at the active mobile communication device 122 may employ the FQDN address of the SMDP+ server 144 to connect to the SMDP+ server 144 in a manner similar to label 162. Alternatively, the LPA 127 at the active mobile communication device 122 may be preprogrammed with the address of an intermediate server that can return the FQDN address of the SMDP+ server 144 that is responsible for the eSIM credentials 112 for the inactive mobile communication device 102. The returned address can then be employed to perform label 191.

At label 192, the eSIM identification data is sent to the SMDP+ server 144 in a manner similar to label 164. However, the eSIM identification data of label 192 may contain less data than the eSIM identification data of label 164. For example, at label 192 the eSIM identification data may include the lookup value for the inactive mobile communication device 102, the confirmation code for the user, and the EID for the active mobile communication device 122.

At label 193, the SMDP+ server 144 can employ the lookup value for the inactive mobile communication device 102 to access a relevant entry in a lookup table and obtain the remaining eSIM identification data. For example, the EID of the inactive mobile communication device 102, the ICCID, and/or the matching ID may be obtained from the lookup table. In another example, the EID of the inactive mobile communication device 102 may be used as the lookup value, in which case the lookup process returns the ICCID, and/or the matching ID. Labels 194, 195, 196, 197, and 198 are substantially similar to labels 166, 168, 170, 172, and 174, respectively.

Figure 4:
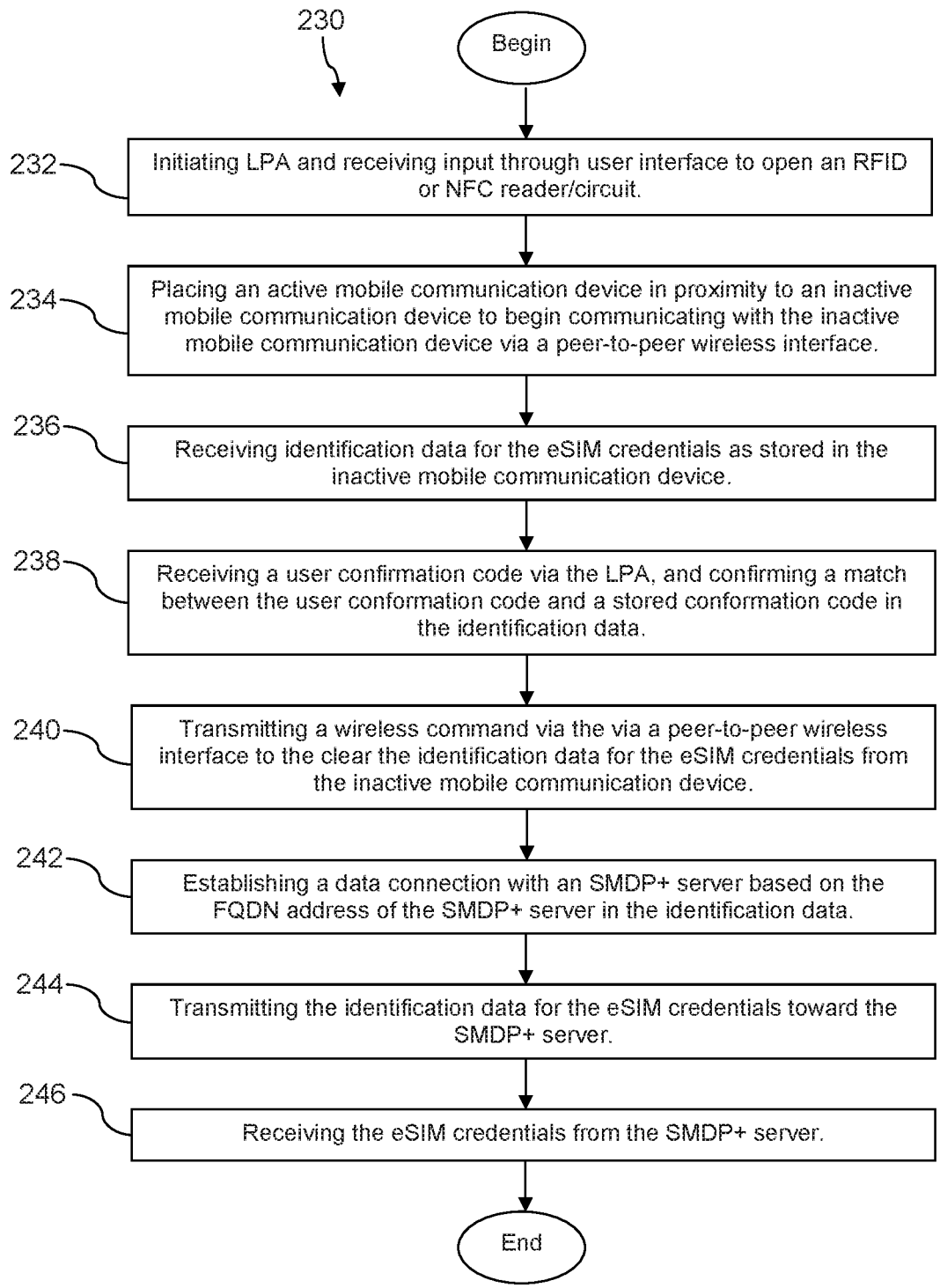
FIG. 4 is a flow chart of a method of obtaining eSIM credentials from an inactive mobile communication device by an active mobile communication device according to an embodiment of the disclosure.

Turning now to FIG. 4, a method 230 is described. In an embodiment, the method 230 supports obtaining eSIM credentials from an inactive mobile communication device by an active mobile communication device (e.g., inactive mobile communication device 102 and active mobile communication device 122, respectively).

At block 232, an LPA is initiated, for example by a user. The LPA can then receive input through user interface to open an RFID or NFC reader/circuit. At block 234, the active mobile communication device is placed in proximity (e.g., three feet or less) to the inactive mobile communication device. This may allow the active mobile communication device to begin communicating with the inactive mobile communication device via a peer-to-peer wireless interface. In some embodiments, the peer-to-peer wireless interface is an RFID reader and hence communicating with the inactive mobile communication device includes communicating via a RFID circuit in the inactive mobile communication device. In some embodiments, the peer-to-peer wireless interface is an NFC circuit/reader and hence communicating with the inactive mobile communication device includes communicating via a NFC circuit in the inactive mobile communication device.

At block 236, identification data for the eSIM credentials is received at the active mobile communication device. Such data is received as stored in the inactive mobile communication device, for example in a memory tag. The identification data for the eSIM credentials may include a stored confirmation code associated with a user. The identification data for the eSIM credentials may also include a FQDN address of an SMDP+ server responsible for managing the eSIM credentials. The identification data for the eSIM credentials may also include an ICCID of the inactive mobile communication device, an EID of the inactive mobile communication device, a matching ID associated with the eSIM credentials, or combinations thereof. In other examples, the identification data for the eSIM credentials includes data uniquely identifying the inactive mobile communication device to support looking up an ICCID of the inactive mobile communication device, an EID of the inactive mobile communication device, a matching ID associated with the eSIM credentials, a confirmation code associated with a user, or combinations thereof.

At block 238, a user confirmation code is received from a user via an LPA, for example upon prompting the user for such input. A match between the user conformation code and the stored conformation code may be confirmed prior to proceeding to additional blocks. It should be noted that the user confirmation code of block 238 may also be implemented using other mechanisms. In some examples, a user defined code (e.g., a PIN code and/or a confirmation code) may only be stored within the SMDP+ server (e.g., rather than stored locally within the inactive mobile communications device). In such a case, validation of such the user confirmation code may involve communication between the LPA and the SMDP+ server. In such a case, validation of the user confirmation code takes place on the SMDP+ server instead of locally on the active mobile communications device. Such an approach may reduce the opportunity for malicious retrieval of the confirmation code, and hence reduce the possibility of attempts to hijack the eSIM profile of an inactive mobile communications device.

At block 240, a wireless command can be transmitted via a peer-to-peer wireless interface to clear the identification data for the eSIM credentials from the inactive mobile communication device. This may prevent the eSIM credentials from being reused if the inactive mobile communication device is later repaired.

At block 242, the LPA may establish a data connection with the SMDP+ server based on the FQDN address of the SMDP+ server in the identification data. The LPA may then transmit the identification data for the eSIM credentials toward the SMDP+ server at block 244. Upon successful validations, fraud checks, etc., for example according to method 250 below, a download may be initiated to cause the eSIM credentials to be received from the SMDP+ server at block 246. The eSIM credentials can then be installed and activated to allow the active mobile communication device to access the RAN in place of the inactive mobile communication device.

Figure 5:
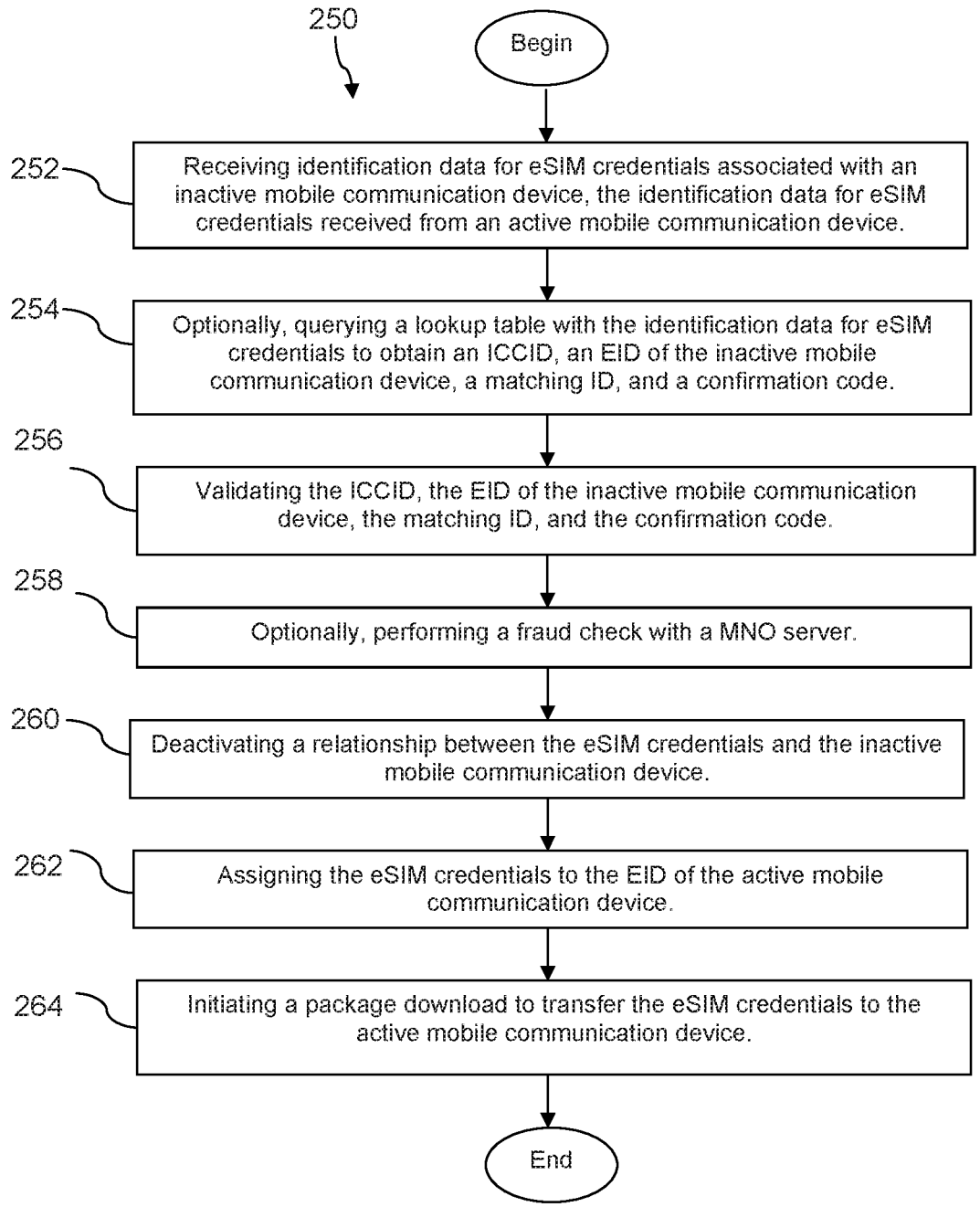
FIG. 5 is a flow chart of a method of updating eSIM credentials from an inactive mobile communication device to an active mobile communication device at an SMDP+ server according to an embodiment of the disclosure.

Turning now to FIG. 5, a method 250 is described. In an embodiment, the method 250 supports updating eSIM credentials from an inactive mobile communication device to an active mobile communication device at an SMDP+ server (e.g., active mobile communication device 122 and SMDP+ server 144, respectively). Method 250 may initiate in response to method 230.

At block 252, identification data for eSIM credentials are received at the SMDP+ server. Such identification data for eSIM credentials is associated with the inactive mobile communication device. Further, the identification data for the eSIM credentials is received from an active mobile communication device on behalf of the inactive mobile communication device. In some examples, the identification data for eSIM credentials may include an ICCID of the inactive mobile communication device, an EID of the inactive mobile communication device, a matching ID associated with the eSIM credentials, a confirmation code associated with the user, and an EID of the active mobile communication device. In other examples, the identification data for eSIM credentials can include data uniquely identifying the inactive mobile communication device and the EID of the active mobile communication device.

Optional block 254 may be employed when the identification data for eSIM credentials includes data uniquely identifying the inactive mobile communication device, but does not include a full set of eSIM identification data. At optional block 254, a lookup table is queried with the identification data for eSIM credentials to obtain the ICCID of the inactive mobile communication device, the EID of the inactive mobile communication device, the matching ID associated with the eSIM credentials, the confirmation code associated with the user, or combinations thereof.

At block 256, the ICCID of the inactive mobile communication device, the EID of the inactive mobile communication device, the matching ID associated with the eSIM credentials, and/or the confirmation code associated with the user are validated, for example to verify that the eSIM credentials are valid and should be transferred. Further, at block 258, an optional fraud check can be performed with a MNO server prior to proceeding to further blocks in method 250.

At block 260 the relationship between the eSIM credentials and the inactive mobile communication device is deactivated. It should be noted that block 260 may be performed before, after, and/or contemporaneously with block 262. At block 262, the eSIM credentials are assigned to the EID of the active mobile communication device. At block 264, a package download is initiated to transfer the eSIM credentials to the active mobile communication device.

Figure 6:
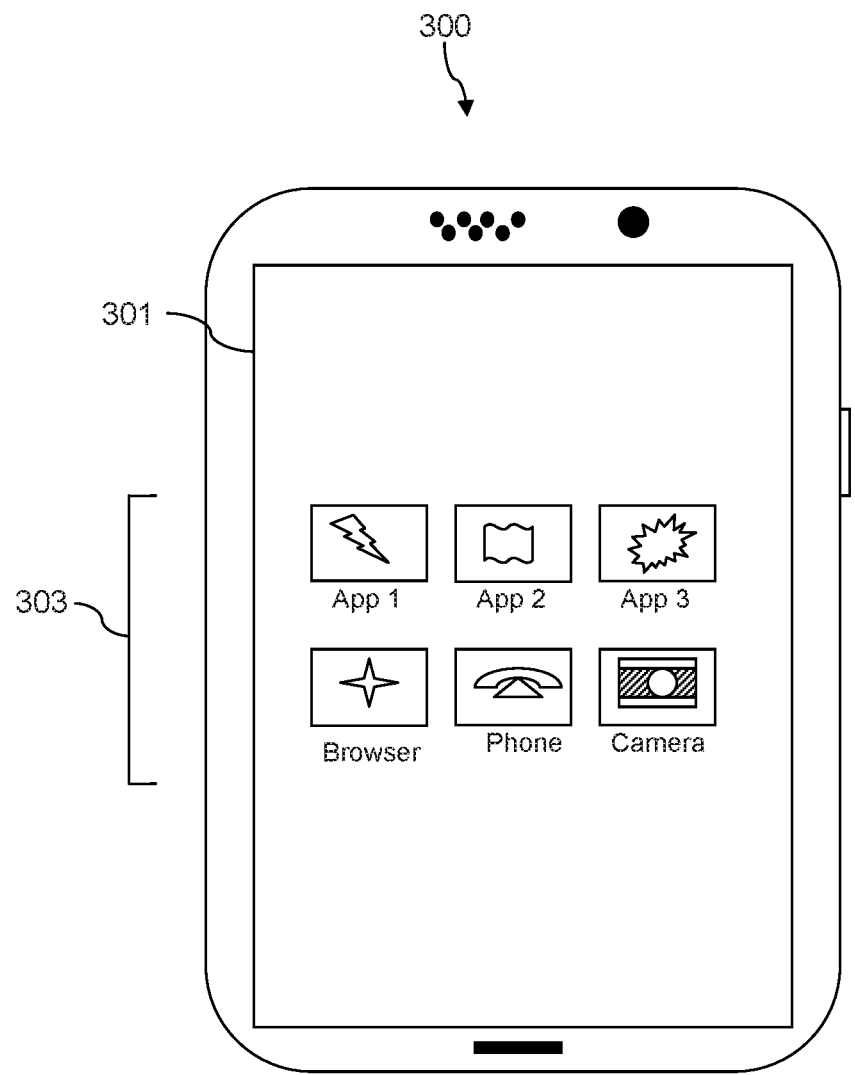
FIG. 6 is an illustration of a mobile communication device according to an embodiment of the disclosure.

FIG. 6 depicts the user equipment (UE) 300, which is operable for implementing aspects of the present disclosure, but the present disclosure should not be limited to these implementations. Though illustrated as a mobile phone, the UE 300 may take various forms including a wireless handset, a pager, a personal digital assistant (PDA), a gaming device, or a media player. The UE 300 includes a touch screen display 301 having a touch-sensitive surface for input by a user. A small number of application icons 303 are illustrated within the touch screen display 301. It is understood that in different embodiments, any number of application icons 303 may be presented in the touch screen display 301. In some embodiments of the UE 300, a user may be able to download and install additional applications on the UE 300, and an icon associated with such downloaded and installed applications may be added to the touch screen display 301 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 301 to show a web page. The web page may be obtained via wireless communications with a base transceiver station, a wireless network access node, a peer UE 300 or any other wireless communication network or system.

Figure 7:
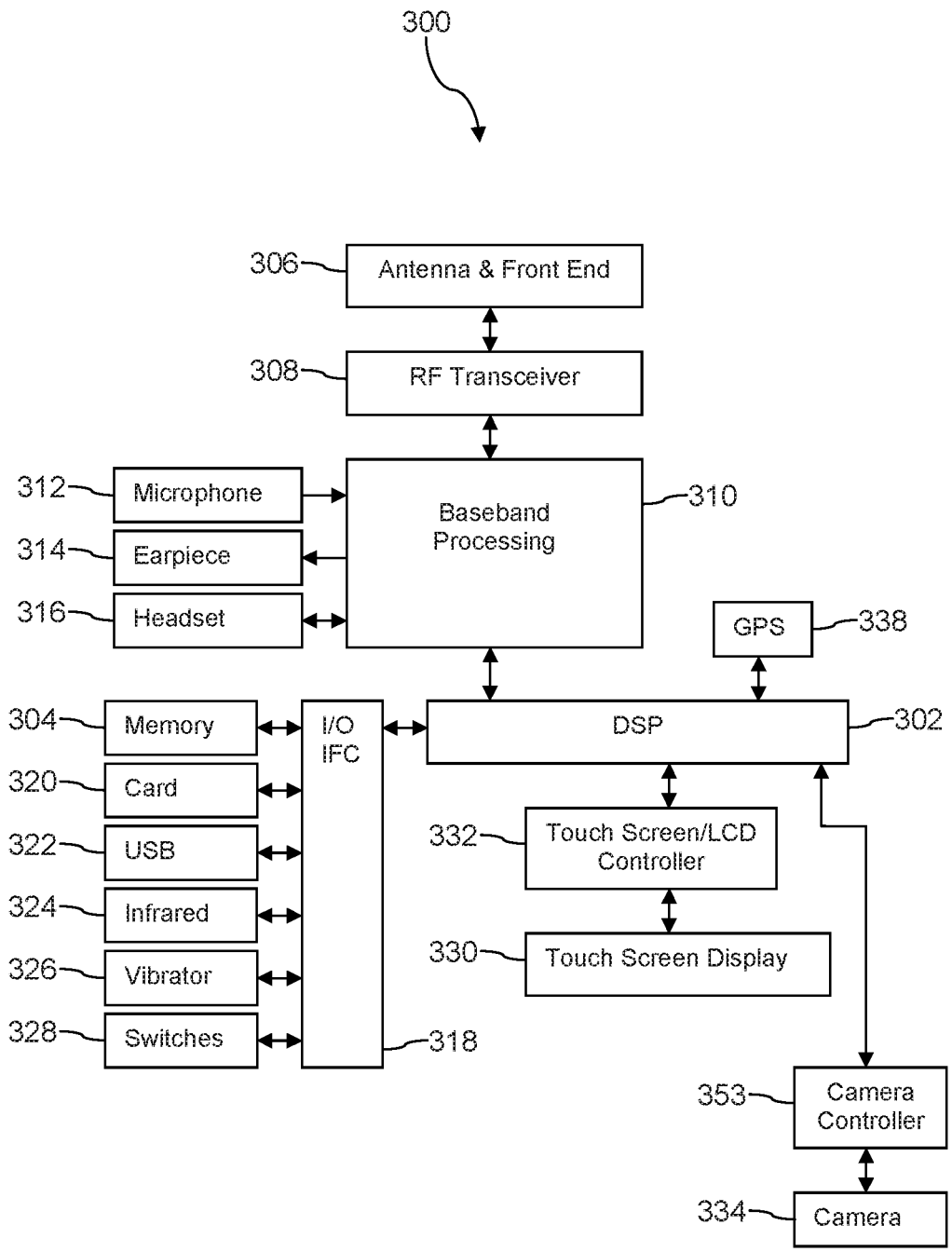
FIG. 7 is a block diagram of a hardware architecture of a mobile communication device according to an embodiment of the disclosure.

FIG. 7 shows a block diagram of the UE 300. While a variety of known components of handsets are depicted, in an embodiment a subset of the listed components and/or additional components not listed may be included in the UE 300. The UE 300 includes a digital signal processor (DSP) 302 and a memory 304. As shown, the UE 300 may further include an antenna and front end unit 306, a radio frequency (RF) transceiver 308, a baseband processing unit 310, a microphone 312, an earpiece speaker 314, a headset port 316, an input/output interface 318, a removable memory card 320, a universal serial bus (USB) port 322, an infrared port 324, a vibrator 326, one or more electro-mechanical switches 328, a touch screen liquid crystal display (LCD) with a touch screen display 330, a touch screen/LCD controller 332, a camera 334, a camera controller 336, and a global positioning system (GPS) receiver 338. In an embodiment, the UE 300 may include another kind of display that does not provide a touch sensitive screen. In an embodiment, the UE 300 may include both the touch screen display 330 and additional display component that does not provide a touch sensitive screen. In an embodiment, the DSP 302 may communicate directly with the memory 304 without passing through the input/output interface 318. Additionally, in an embodiment, the UE 300 may comprise other peripheral devices that provide other functionality.

The DSP 302 or some other form of controller or central processing unit operates to control the various components of the UE 300 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the UE 300 to function as a peripheral device to exchange information with a personal computer or other computer system. The infrared port 324 and other optional ports such as a Bluetooth® interface or an IEEE 802.11 compliant wireless interface may enable the UE 300 to communicate wirelessly with other nearby handsets and/or wireless base stations. In an embodiment, the UE 300 may comprise a near field communication (NFC) transceiver. The NFC transceiver may be used to complete payment transactions with point-of-sale terminals or other communications exchanges. In an embodiment, the UE 300 may comprise a radio frequency identify (RFID) reader and/or writer device.

The switches 328 may couple to the DSP 302 via the input/output interface 318 to provide one mechanism for the user to provide input to the UE 300. Alternatively, one or more of the switches 328 may be coupled to a motherboard of the UE 300 and/or to components of the UE 300 via a different path (e.g., not via the input/output interface 318), for example coupled to a power control circuit (power button) of the UE 300. The touch screen display 330 is another input mechanism, which further displays text and/or graphics to the user. The touch screen LCD controller 332 couples the DSP 302 to the touch screen display 330. The GPS receiver 338 is coupled to the DSP 302 to decode global positioning system signals, thereby enabling the UE 300 to determine its position.

Figure 8A:
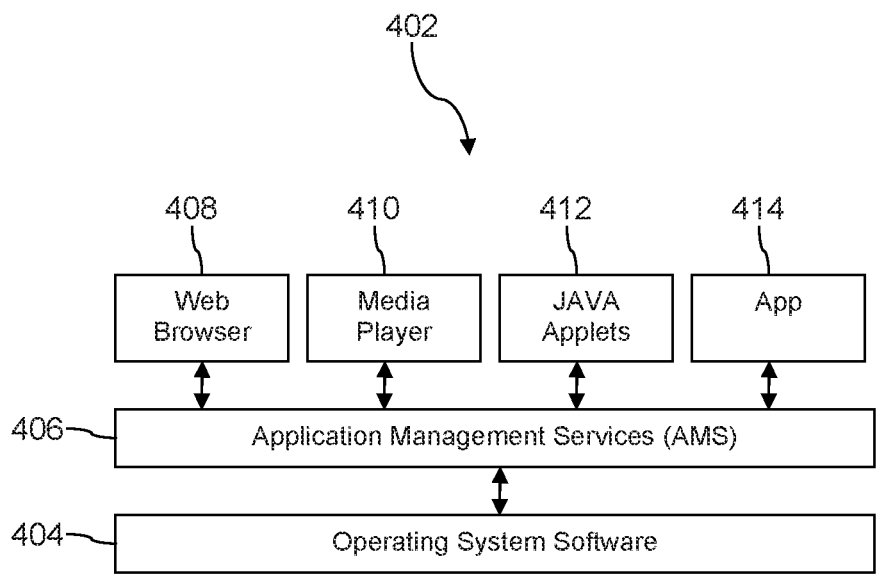
FIG. 8A is a block diagram of a software architecture of a mobile communication device according to an embodiment of the disclosure.

FIG. 8A illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services (AMS) 406 that transfer control between applications running on the UE 300. Also shown in FIG. 8A are a web browser application 408, a media player application 410, JAVA applets 412, and an application 414. The web browser application 408 may be executed by the UE 300 to browse content and/or the Internet, for example when the UE 300 is coupled to a network via a wireless link. The web browser application 408 may permit a user to enter information into forms and select links to retrieve and view web pages. The media player application 410 may be executed by the UE 300 to play audio or audiovisual media.

The JAVA applets 412 may be executed by the UE 300 to provide a variety of functionality including games, utilities, and other functionality. The application 414 may be employed to implement an LPA, such as LPA 127. As such, the application 414 may be employed to manage eSIM credentials as described in detail above.

Figure 8B:
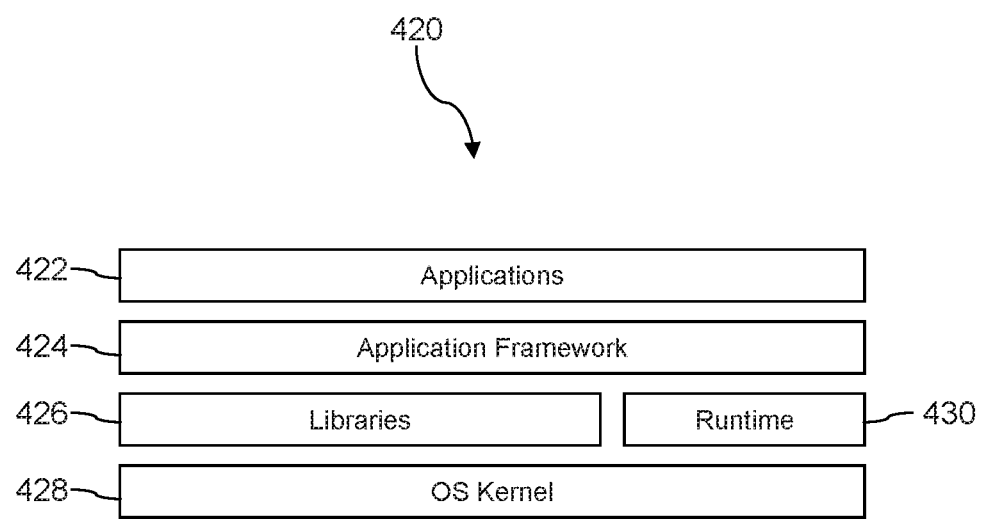
FIG. 8B is a block diagram of another software architecture of a mobile communication device according to an embodiment of the disclosure.

FIG. 8B illustrates an alternative software environment 420 that may be implemented by the DSP 302. The DSP 302 executes operating system kernel (OS kernel) 428 and an execution runtime 430. The DSP 302 executes applications 422 that may execute in the execution runtime 430 and may rely upon services provided by the application framework 424. Applications 422 and the application framework 424 may rely upon functionality provided via the libraries 426.

Figure 9:
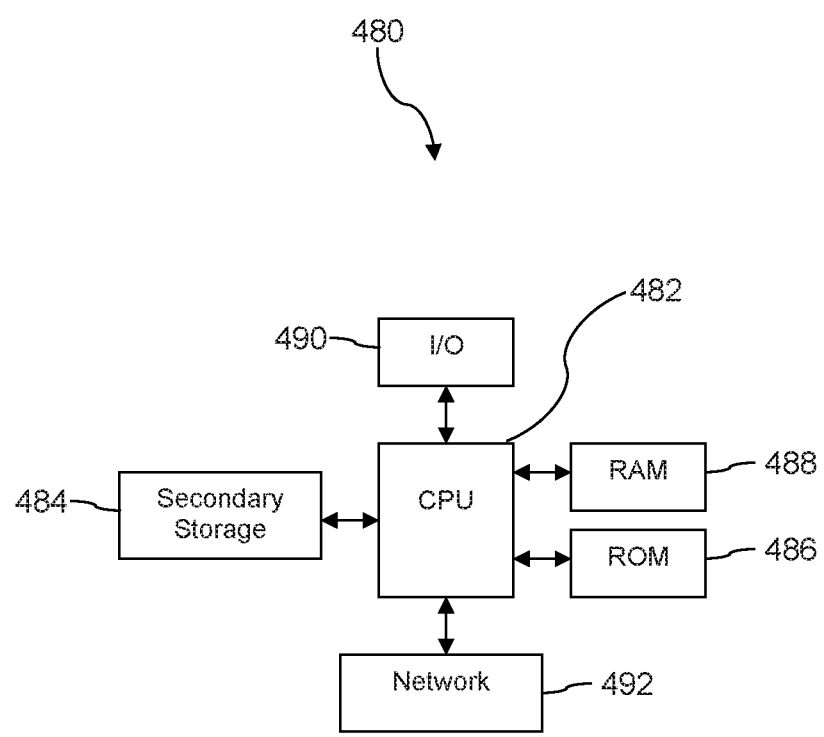
FIG. 9 is a block diagram of a computer system according to an embodiment of the disclosure.

FIG. 9 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 480 is turned on or booted, the CPU 482 may execute a computer program or application. For example, the CPU 482 may execute software or firmware stored in the ROM 486 or stored in the RAM 488. In some cases, on boot and/or when the application is initiated, the CPU 482 may copy the application or portions of the application from the secondary storage 484 to the RAM 488 or to memory space within the CPU 482 itself, and the CPU 482 may then execute instructions that the application is comprised of. In some cases, the CPU 482 may copy the application or portions of the application from memory accessed via the network connectivity devices 492 or via the I/O devices 490 to the RAM 488 or to memory space within the CPU 482, and the CPU 482 may then execute instructions that the application is comprised of. During execution, an application may load instructions into the CPU 482, for example load some of the instructions of the application into a cache of the CPU 482. In some contexts, an application that is executed may be said to configure the CPU 482 to do something, e.g., to configure the CPU 482 to perform the function or functions promoted by the subject application. When the CPU 482 is configured in this way by the application, the CPU 482 becomes a specific purpose computer or a specific purpose machine.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), flash drive, ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer system 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of updating electronic subscriber identity module (eSIM) credentials from an inactive mobile communication device to an active mobile communication device, comprising:
   receiving, at a subscription manager data preparation (SMDP+) server from the active mobile communication device, identification data for eSIM credentials associated with the inactive mobile communication device;
   validating, by the SMDP+ server, an integrated circuit card identifier (ICCID) of the inactive mobile communication device and a confirmation code associated with a user;
   assigning the eSIM credentials to an EID of the active mobile communication device; and
   initiating, by the SMDP+ server, a package download to transfer the eSIM credentials to the active mobile communication device.

2. The method of claim 1, wherein the identification data for eSIM credentials includes the ICCID of the inactive mobile communication device and the confirmation code associated with the user.

3. The method of claim 2, wherein the identification data for eSIM credentials further includes an EID of the inactive mobile communication device, a matching ID associated with the eSIM credentials, and the EID of the active mobile communication device.

4. The method of claim 1, wherein the identification data for eSIM credentials includes data uniquely identifying the inactive mobile communication device and the EID of the active mobile communication device, and further comprising:
   querying a lookup table with the identification data for eSIM credentials to obtain the ICCID of the inactive mobile communication device, an EID of the inactive mobile communication device, a matching ID associated with the eSIM credentials, the confirmation code associated with the user, or combinations thereof.

5. The method of claim 1, further comprising:
   performing a fraud check with a mobile network operator (MNO) server prior to assigning the eSIM credentials to the EID of the active mobile communication device.

6. The method of claim 1, further comprising:
   deactivating a relationship between the eSIM credentials and the inactive mobile communication device contemporaneously with assigning the eSIM credentials to the EID of the active mobile communication device.

7. A system for updating electronic subscriber identity module (eSIM) credentials from an inactive mobile communication device to an active mobile communication device, comprising:
   a subscription manager data preparation (SMDP+) server configured to:
      receive identification data for eSIM credentials associated with the inactive mobile communication device from the active mobile communication device,
      validate an integrated circuit card identifier (ICCID) of the inactive mobile communication device and a confirmation code associated with a user,
      assign the eSIM credentials to an EID of the active mobile communication device, and
      initiate a package download to transfer the eSIM credentials to the active mobile communication device.

8. The system of claim 7, wherein the identification data for eSIM credentials includes the ICCID of the inactive mobile communication device and the confirmation code associated with the user.

9. The system of claim 8, wherein the identification data for eSIM credentials further includes an EID of the inactive mobile communication device, a matching ID associated with the eSIM credentials, and the EID of the active mobile communication device.

10. The system of claim 7, wherein the identification data for eSIM credentials includes data uniquely identifying the inactive mobile communication device and the EID of the active mobile communication device, and wherein the SMDP+ server is further configured to:
query a lookup table with the identification data for eSIM credentials to obtain the ICCID of the inactive mobile communication device, an EID of the inactive mobile communication device, a matching ID associated with the eSIM credentials, the confirmation code associated with the user, or combinations thereof.

11. The system of claim 7, wherein the SMDP+ server is further configured to:
perform a fraud check with a mobile network operator (MNO) server prior to assigning the eSIM credentials to the EID of the active mobile communication device.

12. The system of claim 7, wherein the SMDP+ server is further configured to:
deactivate a relationship between the eSIM credentials and the inactive mobile communication device contemporaneously with assigning the eSIM credentials to the EID of the active mobile communication device.

13. A method of obtaining electronic subscriber identity module (eSIM) credentials from an inactive mobile communication device, comprising:
communicating, by an active mobile communication device, with an inactive mobile communication device via a peer-to-peer wireless interface;
receiving, by the active mobile communication device, identification data for the eSIM credentials as stored in the inactive mobile communication device;
transmitting, by the active mobile communication device, the identification data for the eSIM credentials to a subscription manager data preparation (SMDP+) server;
receiving, by the active mobile communication device, the eSIM credentials from the SMDP+ server; and
transmitting, by the active mobile communication device, a wireless command via a peer-to-peer wireless interface to the inactive mobile communication device, wherein the identification data for the eSIM credentials is cleared from the inactive mobile communication device based on the wireless command.

14. The method of claim 13, wherein communicating with the inactive mobile communication device includes communicating via a radio frequency identity (RFID) circuit in the inactive mobile communication device.

15. The method of claim 13, wherein communicating with the inactive mobile communication device includes communicating via a near field communication (NFC) circuit in the inactive mobile communication device.

16. The method of claim 13, wherein the identification data for the eSIM credentials include a stored confirmation code, and further comprising:
receiving, by the active mobile communication device, a user confirmation code from a user via user interface; and
confirming, by the active mobile communication device, a match between the user confirmation code and the stored confirmation code prior to transmitting the identification data for the eSIM credentials to the SMDP+ server.

17. The method of claim 13, wherein the identification data for the eSIM credentials includes a fully qualified domain name (FQDN) address of the SMDP+ server, and further comprising:
establishing, by the active mobile communication device, a data connection with the SMDP+ server based on the FQDN address of the SMDP+ server.

18. The method of claim 13, wherein the identification data for the eSIM credentials includes an integrated circuit card identifier (ICCID) of the inactive mobile communication device, an embedded universal integrated circuit card identifier (EID) of the inactive mobile communication device, a matching identifier (ID) associated with the eSIM credentials, a confirmation code associated with a user, or combinations thereof.

19. The method of claim 13, wherein the identification data for the eSIM credentials includes data uniquely identifying the inactive mobile communication device to support looking up an integrated circuit card identifier (ICCID) of the inactive mobile communication device, an embedded universal integrated circuit card identifier (EID) of the inactive mobile communication device, a matching identifier (ID) associated with the eSIM credentials, a confirmation code associated with a user, or combinations thereof.

20. The method of claim 13, wherein the eSIM credentials are received by the active mobile communication device from the SMDP+ server in response to the SMDP+ server performing a fraud check with a mobile network operator (MNO) server.

* * * * *